(12) United States Patent
Wang et al.

(10) Patent No.: US 12,118,808 B2
(45) Date of Patent: Oct. 15, 2024

(54) IMAGE GENERATION METHOD, COMPUTING DEVICE, AND STORAGE MEDIUM

(71) Applicant: HON HAI PRECISION INDUSTRY CO., LTD., New Taipei (TW)

(72) Inventors: Cheng-Feng Wang, Kaohsiung (TW); Po-Chung Wang, New Taipei (TW); Li-Che Lin, Kaohsiung (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 377 days.

(21) Appl. No.: 17/830,518

(22) Filed: Jun. 2, 2022

(65) Prior Publication Data
US 2023/0043408 A1 Feb. 9, 2023

(30) Foreign Application Priority Data
Aug. 3, 2021 (CN) .......................... 202110888256.0

(51) Int. Cl.
*G06V 30/12* (2022.01)
*G06T 5/50* (2006.01)
(Continued)

(52) U.S. Cl.
CPC .............. *G06V 30/133* (2022.01); *G06T 5/50* (2013.01); *G06T 7/0002* (2013.01); *G06V 30/153* (2022.01)

(58) Field of Classification Search
CPC .... G06V 30/133; G06V 30/153; G06V 10/82; G06T 5/50; G06T 7/0002
See application file for complete search history.

(56) References Cited

U.S. PATENT DOCUMENTS

2022/0172337 A1* 6/2022 Li ...................... G06V 30/1444

FOREIGN PATENT DOCUMENTS

CN 110956147 A * 4/2020 ......... G06K 9/00456

OTHER PUBLICATIONS

Shunsuke Kitada et al. "End-to-End Text Classification via Image-based Embedding using Character-level Networks." Applied Imagery Pattern Recognition Workshop (AIPR), 2018, pp. 1-4, IEEE.
(Continued)

*Primary Examiner* — Umair Ahsan
(74) *Attorney, Agent, or Firm* — ScienBiziP, P.C.

(57) ABSTRACT

An image generation method obtains an original image. A character area, a background area, and a position of each flawless character in the original image are determined. The character area is segmented to obtain a first image of each flawless character. A background is removed from the first image to obtain a second image. First image processing is performed on the second image to obtain a third image. Second image processing is performed on the second image to obtain fourth images. Third image processing is performed on the fourth images respectively to obtain fifth images. A similarity between each fifth image and the third image is calculated. When the similarity is greater than a defect threshold, a background image is segmented. Brightness of the background image is adjusted. The target fourth image and adjusted background image are synthesized. The method can generate images with defective characters quickly.

20 Claims, 5 Drawing Sheets

(51) Int. Cl.
*G06T 7/00* (2017.01)
*G06V 30/148* (2022.01)

(56) References Cited

OTHER PUBLICATIONS

Arshia Rehman et al. "Writer identification using machine learning approaches: a comprehensive review." Multimedia Tools and Applications (2019) 78, pp. 10889-10931, Springer.

* cited by examiner

IMAGE GENERATION METHOD, COMPUTING DEVICE, AND STORAGE MEDIUM

FIELD

The subject matter herein generally relates to image processing, specifically an image generation method, a computing device, and a storage medium.

BACKGROUND

Defective characters (such as misprinted letters and numbers) in images can be detected by a neural network. To achieve accurate detection, a large number of training images are used to train the neural network. The training images include images with defective characters, however, images suitable for training are not common.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure. However, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

Figure 1:
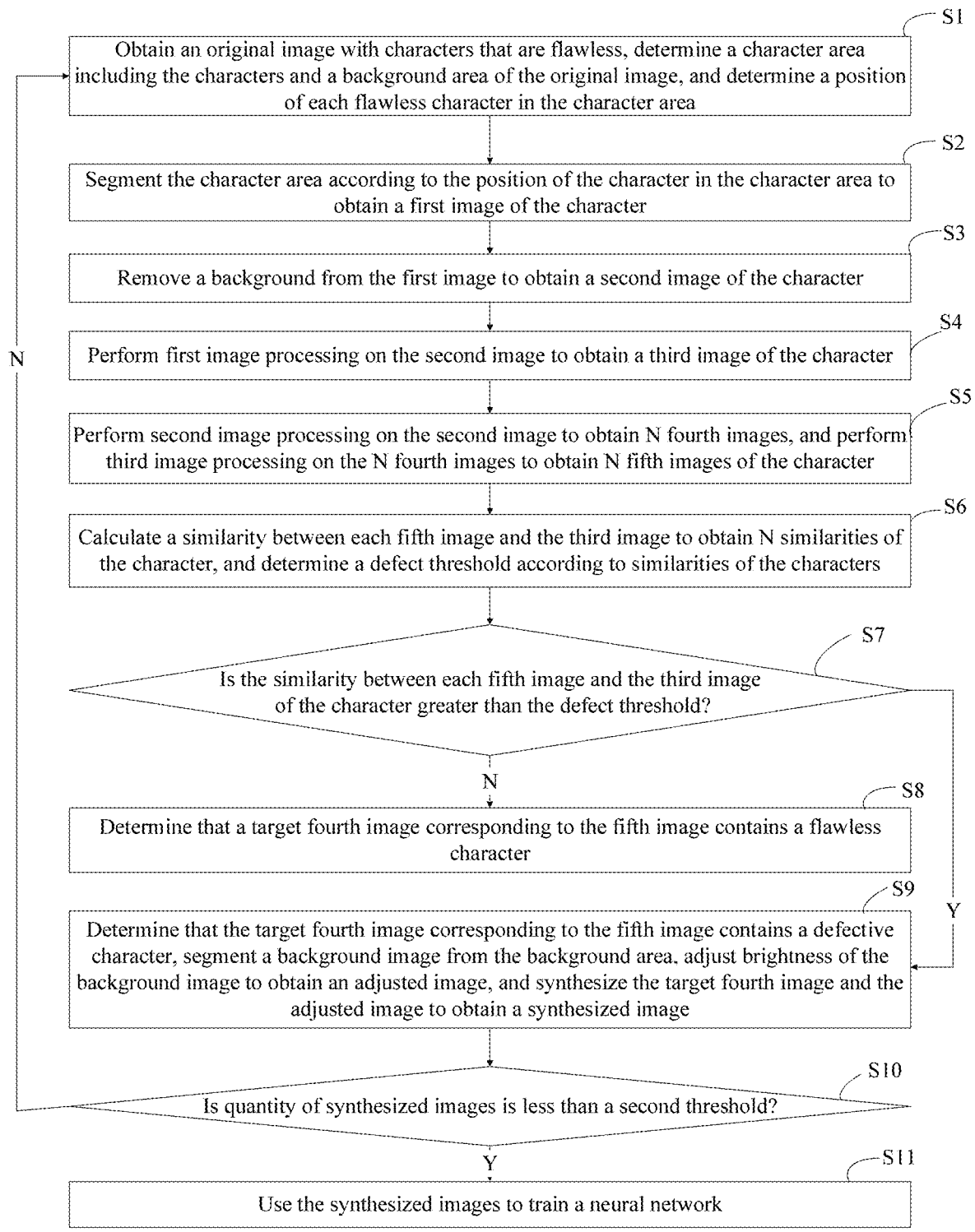
FIG. 1 is a flowchart of an image generation method provided in one embodiment of the present disclosure.

FIG. 1 is a flowchart of an image generation method in one embodiment. The method can generate images with defective characters quickly. According to different requirements, the order of the blocks in the flowchart may be changed, and some blocks may be omitted.

Figure 2:
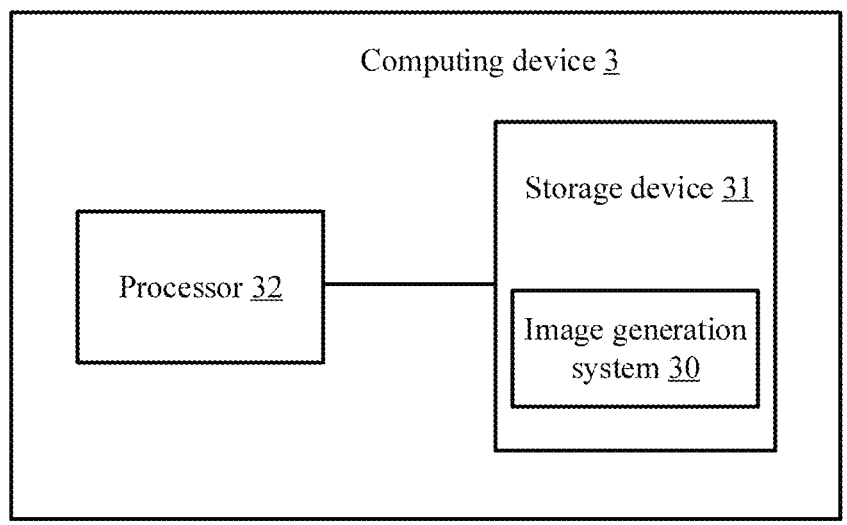
FIG. 2 is a block diagram of a computing device implementing the method in one embodiment of the present disclosure.

The method may be executed by a computing device (e.g., computing device 3 in FIG. 2). The method can be integrated in the computing device 3, or in a software development kit (SDK) run in the computing device 3.

In block S1, the computing device obtains an original image with characters that are flawless ("flawless characters"), determines a character area including the characters and a background area of the original image, and determines a position of each flawless character in the character area.

In one embodiment, the computing device may obtain the original image in response to a user input. The original image may be pre-stored in a storage device of the computing device or may be a storage device connected to the computing device. The original image may be an image of a product. The original image contains characters (e.g., Chinese characters, numbers, English letters, etc.) that are perfectly displayed and flawless. For example, the original image contains perfectly-formed printed characters.

Figure 3A:
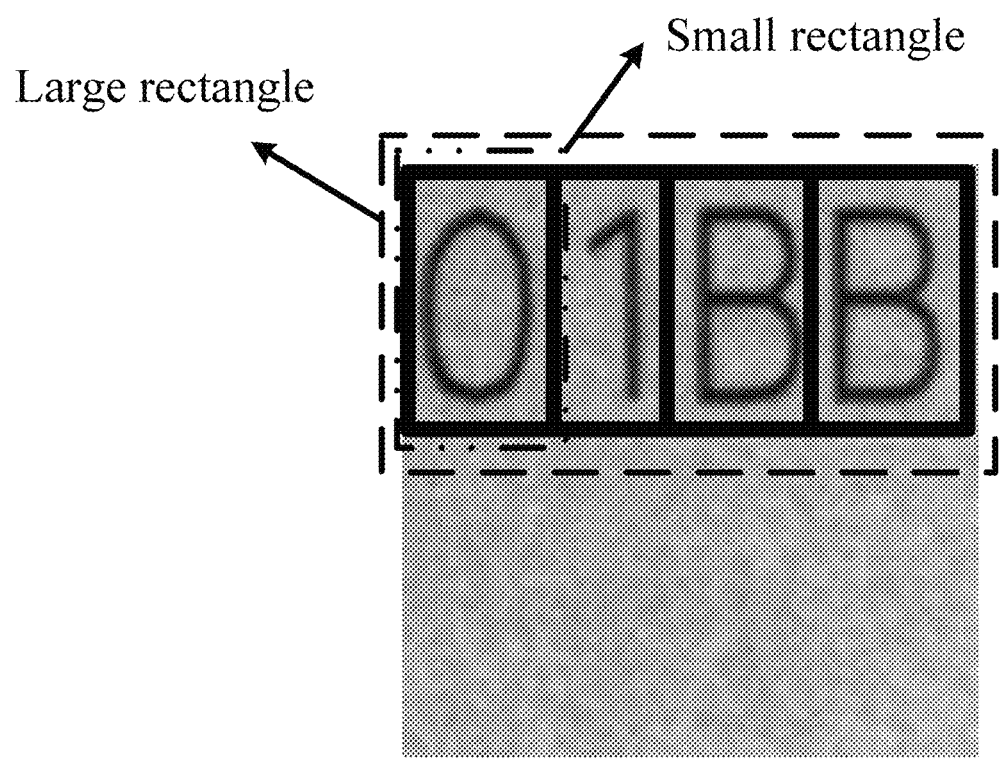
FIG. 3A shows a character area, a background area, and first images in an original image.

In one embodiment, the computing device may use optical character recognition (OCR) technology to recognize the characters in the original image, determine the character area including the characters and the background area of the original image, and determine the position of each character in the character area. The character area is an area containing the characters. The background area does not contain any character, that is, it is an area outside the character area in the original image. The computing device may use a region of interest (ROI) technology to determine the character area. FIG. 3A shows a character area, a background area, and first images in an original image. A large rectangle with solid lines denotes the character area of the original image.

In block S2, the computing device segments the character area according to the position of the character in the character area, to obtain a first image of the character.

In one embodiment, the computing device may use a character-cutting function of OCR software to segment the character area according to the position of each character in the character area, to obtain the first image of each character. The first image of each character contains a complete outline of the character. In one example of FIG. 3A, the large rectangle containing four characters can be segmented into four smaller rectangles with solid lines. Each small rectangle represents a first image and contains a character in the character area. Referring to FIG. 3A, a first small rectangle contains a character "0", a second small rectangle contains a character "1", a third small rectangle contains a character "B", and a fourth small rectangle contains a character "B".

In block S3, the computing device removes a background from the first image to obtain a second image of the character.

The computing device may remove the background from the first image using a first method. In the first method, the computing device may determine a first threshold using an Otsu thresholding algorithm, obtain a mask of the first image according to the first threshold, and perform a bitwise AND operation on the mask and the first image to obtain a foreground image of the first image. The computing device softens edges of the foreground image using Gaussian blur to obtain the second image.

Figure 3B:
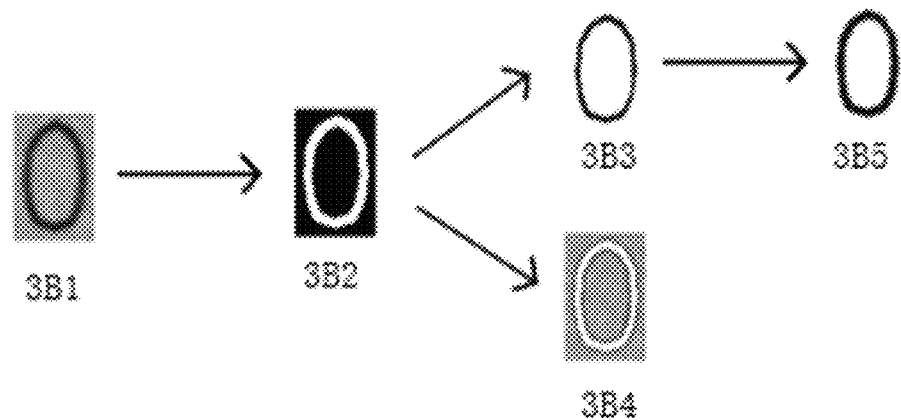
FIG. 3B show a second image based on a first image of FIG. 3A.

The first method may be applied to a first image with low complexity of background. For example, the first image is a silk screen printing image. The computing device may use the Otsu thresholding algorithm to determine the first threshold. The first threshold is used to binarize the first image to obtain the mask of the first image. FIG. 3B show a second image based on a first image of FIG. 3A. In FIG. 3B, 3B1 is a first image of the character "0" in FIG. 3A, 3B2 is a mask of the first image 3B1.

The bitwise AND operation separates a foreground from a background in the first image to obtain the foreground image and the background image. A background of the foreground image is transparent. Referring to FIG. 3B, a foreground image 3B3 and a background image 3B4 of the first image 3B1 are obtained, based on the mask 3B2.

In one embodiment, the foreground image may contain jagged edges, Gaussian blur may be used to soften the edges to obtain the second image. Referring to FIG. 3B, edges of the foreground image 3B3 are softened using Gaussian blur to obtain a second image 3B5.

In another embodiment, the computing device may remove the background from the first image using a second method. The computing device may remove dots from the first image via Fourier transform to obtain an image without dots. The computing device binarizes the image without dots to obtain a binarized image, and soften edges of the binarized image using Gaussian blur to obtain the second image.

The second method may be applied to a first image with a background which is highly complex. The first image can be a printing image (such as a color printing image), and the dots in the first image can include square dots, circular dots, etc. The Otsu thresholding algorithm can be used to binarize the image without dots.

In block S4, the computing device performs first image processing on the second image to obtain a third image of the character.

Figure 4:
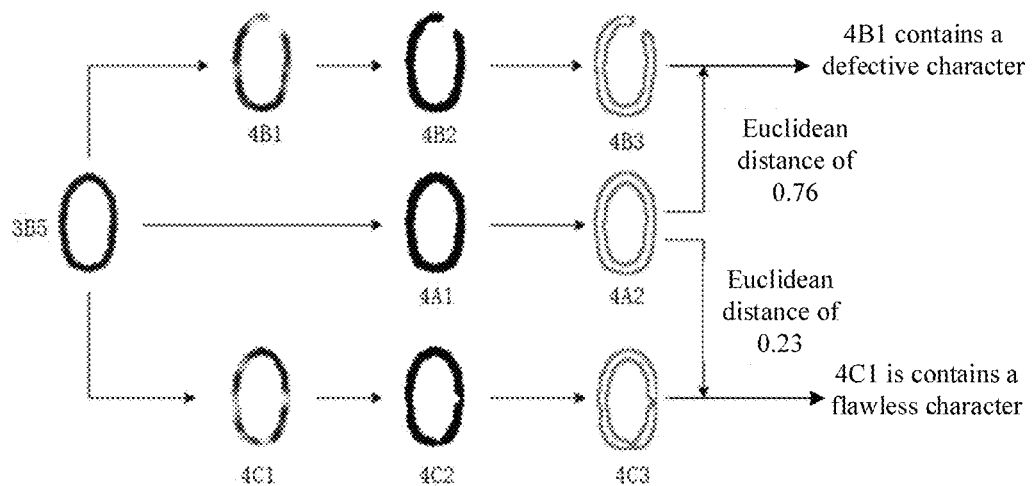
FIG. 4 shows a third image based on the second image of FIG. 3B.

In one embodiment, the first image processing includes image binarization and outline extraction. The computing device performs the image binarization on the second image according to the first threshold. For example, if a pixel value at a certain position of the second image is greater than or equal to the first threshold, a pixel at the certain position is binarized to 255. If the pixel value at the certain position in the second image is smaller than the first threshold, the pixel at the certain position is binarized to 0. FIG. 4 shows a third image based on the second image of FIG. 3B. The second image 3B5 is binarized to obtain an image 4A1.

In one embodiment, the computing device uses a Fourier descriptor algorithm or an invariant moment algorithm to extract an outline of the character in the second image. The Fourier descriptor algorithm can identify closed edges of the character in the second image and reconstruct the closed edges, so as to extract the outline of the character. The invariant moment algorithm describes characteristics of the second image using properties such as translation invariance, scale invariance, and rotation invariance, so as to extract the outline of the character in the second image. For example, referring to FIG. 4, an outline of the image 4A1 is extracted to obtain a third image 4A2. A third image is obtained for each character in the original image. In one example, the original image contains M characters, and M third images are obtained for the M characters. M is a positive integer greater than 0.

In block S5, the computing device performs second image processing on the second image to obtain N fourth images, and performs third image processing on the N fourth images respectively to obtain N fifth images of the character. Each fourth image is performed the third image processing to obtain a fifth image. N is a positive integer greater than 1.

The second image processing may include erasure processing, and the third image processing may include image binarization and outline extraction. In one embodiment, the computing device may use an image erasing tool (e.g., an eraser tool in Photoshop) to randomly erase the second image of each character N times and so obtain the N fourth images. Each of the N times of imaging erasing independently produces one of the N fourth images. For example, as shown in FIG. 4, the second image 3B5 of the character "0" is randomly erased twice to obtain fourth images 4B1 and 4C1.

In one embodiment, the computing device binarizes the N fourth images of each character to obtain N black and white images. For example, as shown in FIG. 4, the computing device binarizes the four image 4B1 to obtain a black and white image 4B2, and binarizes the four image 4C1 image to obtain a black and white image 4C2.

The computing device may extract outlines of the N black and white images to obtain the N fifth images. For example, as shown in FIG. 4, the computing device extracts an outline of the black and white image 4B2 to obtain a fifth image 4B3, and extracts an outline of the black and white image 4C2 to obtain a fifth image 4C3.

In one example, the original image contains M characters, and N fourth images are obtained for each character. Therefore, M*N fourth images and M*N fifth images are obtained for the M characters.

In block S6, the computing device calculates a similarity between each fifth image and the third image to obtain N similarities of the character, and determines a defect threshold according to similarities of the characters.

In one embodiment, the computing device calculates a Euclidean distance between each fifth image and the third image as the similarity. For example, as shown in FIG. 4, 4B3 and 4C3 are fifth images of the character "0", and 4A2 is a third image of the character "0". The computing device calculates a Euclidean distance between the fifth image 4B3 and the third image 4A2 (the Euclidean distance is 0.76 as shown in FIG. 4), and calculates a Euclidean distance between the fifth image 4C3 and the third image 4A2 (the Euclidean distance is 0.23 as shown in FIG. 4). In one example, the original image contains M characters, N fourth images are obtained for each character. Therefore, M*N fourth images, M*N fifth images, and M*N similarities are obtained for the M characters.

In one embodiment, the computing device calculates a frequency distribution of the similarities of the characters in the original image, and determines the defect threshold according to the frequency distribution of the similarities. The frequency distribution shows how often different values of similarity occur. The computing device can draw a line graph to show the frequency distribution of the similarities.

Figure 5:
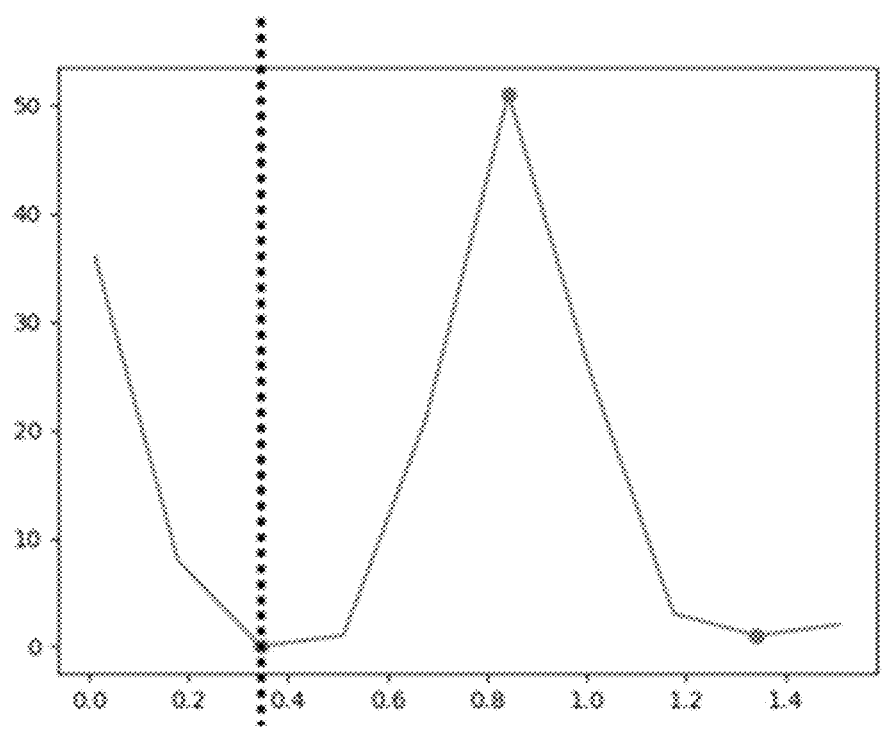
FIG. 5 shows a line graph indicating frequency distribution of similarities of characters in the original image.

For example, the original image contains M characters, M*N similarities are obtained for the M characters. The computing device calculates a frequency distribution of the similarities of the M characters, and draws a line graph to represent the frequency distribution of the similarities of the M characters. A horizontal axis of the line graph denotes similarity, and a vertical axis of the line graph denotes frequency. FIG. 5 shows a line graph indicating frequency distribution of similarities of characters in an original image. Referring to FIG. 5, a frequency corresponding to a value of similarity 0.01 is 36, a frequency corresponding to a value of similarity 0.35 is 0, and a frequency corresponding to a value of similarity 0.82 is 52.

The computing device can select a value of similarity corresponding to a first local minimum frequency in the line graph as the defect threshold. For example, as shown in FIG. 5, a value of similarity corresponding to a first local minimum frequency in the line graph is 0.35, and the defect threshold is determined as 0.35.

In block S7, the computing device determines whether the similarity between each fifth image and the third image of the character is greater than the defect threshold. If the similarity between the fifth image and the third image is not greater than the defect threshold, the process goes to block S8. If the similarity between the fifth image and the third image is greater than the defect threshold, the process goes to block S9.

In block S8, the computing device determines that a target fourth image corresponding to the fifth image contains a flawless character. The target fourth image is one of the N fourth images.

For example, the Euclidean distance between the fifth image 4C3 and the third image 4A2 is 0.23, which is smaller than the defect threshold of 0.35. The computing device determines that the fourth image 4C1 contains a flawless character.

In block S9, the computing device determines that the target fourth image corresponding to the fifth image contains a defective character. The computing device segments a background image from the background area. A size of the background image is equal to a size of the target fourth image. The computing device adjusts brightness of the background image to obtain an adjusted image, and synthesizes the target fourth image and the adjusted image to obtain a synthesized image.

For example, as shown in FIG. 4, the Euclidean distance between the fifth image 4B3 and the third image 4A2 is 0.76, which is greater than the defect threshold of 0.35. The computing device determines that the fourth image 4B1 contains a defective character.

Figure 6:
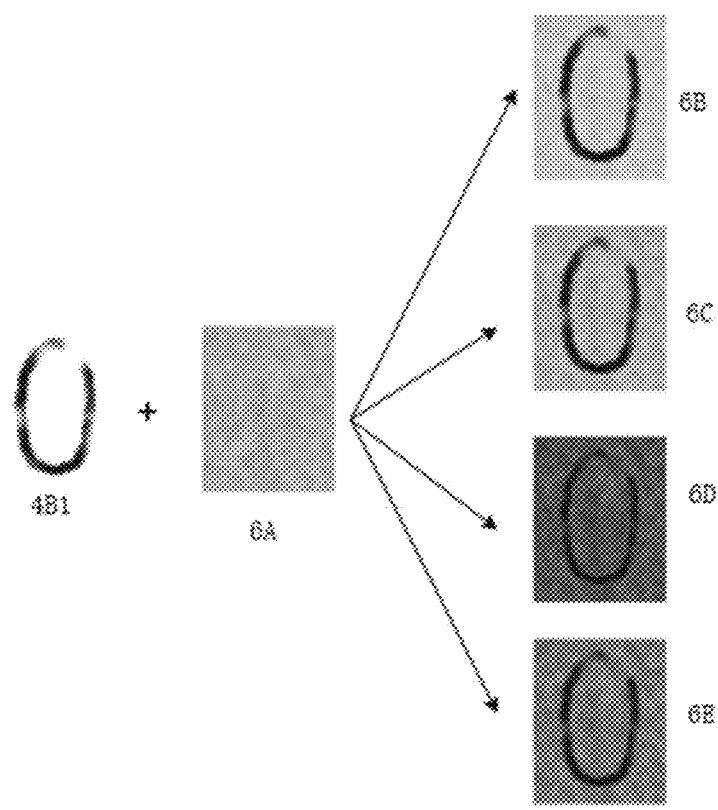
FIG. 6 shows adjusted images based on a fourth image of FIG. 4.

The brightnesses of the character area and the background area may be different. The computing device can adjust the brightness of the background image several times (for example, 4 times) to obtain multiple adjusted images. FIG. 6 shows adjusted images based on the fourth image 4B1 of FIG. 4. The fourth image 4B1 is determined to contain a defective character. The computing device segments a background image 6A with a same size as the fourth image 4B1 from the background area, applies four adjustment of the brightness of the background image 6A to obtain four adjusted images (not shown in FIG. 6), and synthesizes the fourth image 4B1 with the four adjusted images to obtain synthesized images 6B, 6C, 6D, and 6E.

The synthesized images may be used as training images to train a neural network to obtain a defect detection model. Blocks S5 to S9 may be repeated to obtain more synthesized images (e.g., 80 synthesized images).

In one example, the original image contains M characters, and N fourth images are obtained for each character. Therefore, M*N fourth images are obtained for the M characters. The computing device determines that K fourth images in the M*N fourth images contain defective characters, and segments K background images corresponding to the K fourth images from the background area. The computing device adjusts L times a brightness of each of the K background images to obtain L adjusted images for each of the K background images. The computing device synthesizes each adjusted image and corresponding fourth image that contains a defective character to obtain K*L synthesized images for the K fourth images. K is a positive integer less than M*N, and L is a positive integer greater than 1.

In block S10, the computing device determines whether quantity of the synthesized images is less than a second threshold. If quantity of the synthesized images is less than the second threshold, the process returns to block S1. If quantity of the synthesized images is greater than or equal to the second threshold, the process goes to block S11.

In one embodiment, the second threshold may be 100000.

In block S11, the computing device uses the synthesized images to train a neural network to obtain a defect detection model.

FIG. 1 describes in detail the image generation method of the present disclosure. Hardware architecture that implements the image generation method is described in conjunction with FIG. 2.

FIG. 2 is a block diagram of a computing device implementing the method in one embodiment of the present disclosure. The computing device 3 may include a storage device 31 and at least one processor 32. An image generation system 30 may be stored in the storage device 31 and executable by the processor 32. The processor 32 may execute the image generation system 30 to implement the blocks in the image generation method described above, such as the blocks S1 to S11 in FIG. 1.

The computing device 3 may be a device that can perform processing according to preset or stored instructions, such as a desktop computer, a notebook, a palmtop computer, or a cloud server. Hardware of the computing device may include, but is not limited to, a microprocessor, an application-specific integrated circuit (ASIC), a field-programmable gate array (FPGA), a digital signal processor (DSP), an embedded device, etc.

Those skilled in the art will understand that computing device 3 is only an example, and does not constitute a limitation. Other examples of computing device 3 may include more or fewer components than shown in FIG. 5, or may combine some components, or may have different components.

The storage device 31 may be used to store the image generation system 30, and the processor 32 implements the computing device by running or executing the image generation system 30 or module stored in the storage device 31 and calling up data stored in the storage device 31. The storage device 31 may include a storage area for programs and a storage area for data. The storage program area may store an operating system, and programs required by at least one function, etc.; the storage data area may store data and the like created in the use of the computing device 3. In addition, the storage device 31 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 32 may be a central processing unit (CPU) or other general-purpose processor, a digital signal processor (DSP), an application-specific integrated circuit (ASIC), a field-programmable gate array (FPGA) or other programmable logic device, a discrete gate, or a transistor logic device, or a discrete hardware component, etc. The processor 32 may be a microprocessor or any conventional processor. The processor 32 may be a control center of the computing device 3, and connect various parts of the entire computing device 3 by using various interfaces and lines.

In an exemplary embodiment, the image generation system 30 may be divided into one or more modules, and the one or more modules are stored in the storage device 31 and executed by the processor 32 to complete the image generation method of the present disclosure. The one or more modules can be a series of computer-readable instruction segments capable of performing specific functions, and the instruction segments are used to describe execution processes of the image generation system 30 in the computing device 3.

When the modules integrated in the computing device 3 are implemented in the form of software functional units and used as independent units, they can be stored in a non-transitory readable storage medium. According to this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the blocks of the foregoing method embodiments. The computer-readable instructions include computer-readable instruction codes, and the computer-readable instruction codes can be source code, object code, an executable file, or in some other intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

Although not shown, the computing device 3 may also include a power source (such as a battery) for supplying power to various components. The power source may be connected to the at least one processor 32 through a power management device, so as to realize functions such as charging, discharging, and power consumption management. The power supply may also include direct current or alternating current power supplies, recharging devices, power failure detection circuits, power converters or inverters, and power status indicators. The computing device 3 may also include various sensors, BLUETOOTH modules, WI-FI modules, etc.

In several embodiments provided in the preset disclosure, it should be understood that the disclosed computing device and method may be implemented in other ways. For example, the embodiments of the computing device described above are merely illustrative. For example, the units are only divided according to logical function, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the solution of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. An image generation method comprising:
    obtaining an original image with flawless characters, determining a character area comprising the flawless characters and a background area of the original image, and determining a position of each flawless character in the character area;
    segmenting the character area according to the position of the flawless character in the character area to obtain a first image of the flawless character;
    removing a background from the first image to obtain a second image of the flawless character;
    performing first image processing on the second image to obtain a third image of the flawless character;
    performing second image processing on the second image to obtain N fourth images of the flawless character, and performing third image processing on the N fourth images respectively to obtain N fifth images of the flawless character, N being a positive integer greater than 1;
    calculating a similarity between each of the N fifth images and the third image of the flawless character to obtain N similarities of the flawless character, and determining a defect threshold according to similarities of the flawless characters;
    comparing the similarity with the defect threshold, and determining that a target fourth image corresponding to the fifth image contains a defective character when the similarity is greater than the defect threshold, the target fourth image being one of the N fourth images;
    segmenting a background image from the background area, a size of the background image being equal to a size of the target fourth image; and
    adjusting brightness of the background image to obtain at least one adjusted image, and synthesizing the target fourth image and the at least one adjusted image to obtain at least one synthesized image.

2. The method of claim 1, wherein the first image processing comprises image binarization and outline extraction, the second image processing comprises erasure processing, and the third image processing comprises image binarization, and outline extraction.

3. The method of claim 2, wherein removing a background from the first image to obtain a second image of the flawless character comprises:
determining a first threshold using an Otsu thresholding algorithm, obtaining a mask of the first image according to the first threshold, and performing a bitwise AND operation on the mask and the first image to obtain a foreground image of the first image; and
softening edges of the foreground image using Gaussian blur to obtain the second image.

4. The method of claim 3, wherein the first image processing and the third image processing comprise image binarization and outline extraction, the image binarization are performed according to the first threshold, and the outline extraction are performed using a Fourier descriptor algorithm or an invariant moment algorithm.

5. The method of claim 2, wherein removing a background from the first image to obtain a second image of the flawless character comprises:
removing dots from the first image via Fourier transform to obtain an image without dots, and binarizing the image without dots to obtain a binarized image; and
softening edges of the binarized image using Gaussian blur to obtain the second image.

6. The method of claim 2, wherein performing second image processing on the second image to obtain N fourth images comprises:
randomly erasing the second image N times to obtain the N fourth images, wherein each of the N times of imaging erasing independently produces one of the N fourth images; and
performing third image processing on the N fourth images respectively to obtain N fifth images comprises:
performing image binarization on the N fourth images respectively to obtain N black and white images; and
performing outline extraction on the N black and white images respectively to obtain the N fifth images.

7. The method of claim 1, wherein the similarity is a Euclidean distance between each of the N fifth images and the third image of the flawless character; and
determining a defect threshold according to similarities of the flawless characters comprises:
drawing a line graph representing a frequency distribution of the similarities; and
selecting a value of similarity corresponding to a first local minimum frequency in the line graph as the defect threshold.

8. The method of claim 1, wherein adjusting brightness of the background image to obtain at least one adjusted image comprises:
adjusting the brightness of the background image several times to obtain multiple adjusted images; and
synthesizing the target fourth image and each of the multiple adjusted images to obtain multiple synthesized images.

9. A computing device comprising:
at least one processor; and
a storage device storing computer-readable instructions, which when executed by the at least one processor, cause the at least one processor to:
obtain an original image with flawless characters, determine a character area comprising the flawless characters and a background area of the original image, and determine a position of each flawless character in the character area;
segment the character area according to the position of the flawless character in the character area to obtain a first image of the flawless character;
remove a background from the first image to obtain a second image of the flawless character;
perform first image processing on the second image to obtain a third image of the flawless character;
perform second image processing on the second image to obtain N fourth images of the flawless character, and perform third image processing on the N fourth images respectively to obtain N fifth images of the flawless character, N being a positive integer greater than 1;
calculate a similarity between each fifth image and the third image of the flawless character to obtain N similarities of the flawless character, and determine a defect threshold according to similarities of the flawless characters;
compare the similarity with the defect threshold, and determine that a target fourth image corresponding to the fifth image contains a defective character when the similarity is greater than the defect threshold, the target fourth image being one of the N fourth images;
segment a background image from the background area, a size of the background image being equal to a size of the target fourth image; and
adjust brightness of the background image to obtain at least one adjusted image, and synthesize the target fourth image and the at least one adjusted image to obtain at least one synthesized image.

10. The computing device of claim 9, wherein the first image processing comprises image binarization and outline extraction, the second image processing comprises erasure processing, and the third image processing comprises image binarization, and outline extraction.

11. The computing device of claim 10, wherein the at least one processor is further caused to:
determine a first threshold using an Otsu thresholding algorithm, obtain a mask of the first image according to the first threshold, and perform a bitwise AND operation on the mask and the first image to obtain a foreground image of the first image; and
soften edges of the foreground image using Gaussian blur to obtain the second image.

12. The computing device of claim 10, wherein the at least one processor is further caused to:
remove dots from the first image via Fourier transform to obtain an image without dots, and binarize the image without dots to obtain a binarized image; and
soften edges of the binarized image using Gaussian blur to obtain the second image.

13. The computing device of claim 10, wherein the at least one processor is further caused to:
randomly erase the second image N times to obtain the N fourth images, wherein each of the N times of imaging erasing independently produces one of the N fourth images;
perform image binarization on the N fourth images respectively to obtain N black and white images; and
perform outline extraction on the N black and white images respectively to obtain the N fifth images.

14. The computing device of claim 9, wherein the similarity is a Euclidean distance between each of the N fifth images and the third image of the flawless character; and
the at least one processor is further caused to:

draw a line graph representing a frequency distribution of the similarities; and select a value of similarity corresponding to a first local minimum frequency in the line graph as the defect threshold.

15. A non-transitory storage medium having stored thereon computer-readable instructions that, when the computer-readable instructions are executed by a processor to implement the following method:

obtaining an original image with flawless characters, determining a character area comprising the flawless characters and a background area of the original image, and determining a position of each flawless character in the character area;

segmenting the character area according to the position of the flawless character in the character area to obtain a first image of the flawless character;

removing a background from the first image to obtain a second image of the flawless character;

performing first image processing on the second image to obtain a third image of the flawless character;

performing second image processing on the second image to obtain N fourth images of the flawless character, and performing third image processing on the N fourth images respectively to obtain N fifth images of the flawless character, N being a positive integer greater than 1;

calculating a similarity between each fifth image and the third image of the flawless character to obtain N similarities of the flawless character, and determining a defect threshold according to similarities of the flawless characters;

comparing the similarity with the defect threshold, and determining that a target fourth image corresponding to the fifth image contains a defective character when the similarity is greater than the defect threshold, the target fourth image being one of the N fourth images;

segmenting a background image from the background area, a size of the background image being equal to a size of the target fourth image; and adjusting brightness of the background image to obtain at least one adjusted image, and synthesizing the target fourth image and the at least one adjusted image to obtain at least one synthesized image.

16. The non-transitory storage medium of claim 15, wherein the first image processing comprises image binarization and outline extraction, the second image processing comprises erasure processing, and the third image processing comprises image binarization, and outline extraction.

17. The non-transitory storage medium of claim 16, wherein removing a background from the first image to obtain a second image of the flawless character comprises:

determining a first threshold using an Otsu thresholding algorithm, obtaining a mask of the first image according to the first threshold, and performing a bitwise AND operation on the mask and the first image to obtain a foreground image of the first image; and softening edges of the foreground image using Gaussian blur to obtain the second image.

18. The non-transitory storage medium of claim 17, wherein removing a background from the first image to obtain a second image of the flawless character comprises:

removing dots from the first image via Fourier transform to obtain an image without dots, and binarizing the image without dots to obtain a binarized image; and softening edges of the binarized image using Gaussian blur to obtain the second image.

19. The non-transitory storage medium of claim 16, wherein performing second image processing on the second image to obtain N fourth images comprises:

randomly erasing the second image N times to obtain the N fourth images, wherein each of the N times of imaging erasing independently produces one of the N fourth images; and performing third image processing on the N fourth images respectively to obtain N fifth images comprises:

performing image binarization on the N fourth images respectively to obtain N black and white images; and performing outline extraction on the N black and white images respectively to obtain the N fifth images.

20. The non-transitory storage medium of claim 15, wherein the similarity is a Euclidean distance between each of the N fifth images and the third image of the flawless character; and determining a defect threshold according to similarities of the flawless characters comprises:

drawing a line graph representing a frequency distribution of the similarities; and selecting a value of similarity corresponding to a first local minimum frequency in the line graph as the defect threshold.

\* \* \* \* \*